May 29, 1962  J. R. MILES  3,036,498
LENS FOR PROJECTION AND PHOTOGRAPHY
Filed Aug. 26, 1958  2 Sheets-Sheet 1

INVENTOR.
JOHN R. MILES
BY John W. Michael
ATTORNEY

May 29, 1962  J. R. MILES  3,036,498
LENS FOR PROJECTION AND PHOTOGRAPHY
Filed Aug. 26, 1958  2 Sheets-Sheet 2

INVENTOR.
JOHN R. MILES
BY John W. Michael
ATTORNEY

United States Patent Office 3,036,498
Patented May 29, 1962

3,036,498
LENS FOR PROJECTION AND PHOTOGRAPHY

John R. Miles, Glenview, Ill., assignor, by mesne assignments, to Sylvania Electric Products Inc., Ann Arbor, Mich., a corporation of Delaware
Filed Aug. 26, 1958, Ser. No. 757,243
3 Claims. (Cl. 88—57)

This invention relates to photographic and projection objective lenses, and more particularly to improvements in objectives having three lens elements usually termed a triplet.

Heretofore, in the manufacture of optical objectives of this type, the cost has been relatively high due to the use of expensive optical glass as it was the opinion of those skilled in the optical art that good or high performance optical objectives of this type must be manufactured of expensive optical glasses. Applications have also been limited due to the use of metal spacers between adjacent elements.

It is, therefore, an object of this present invention to provide an objective lens which can be manufactured at a considerably reduced cost, and which is at the same time corrected for spherical and chromatic aberrations, coma, astigmatism, and curvature of field throughout a reasonably wide lens angle, while still maintaining a comparatively large relative aperture.

It is another object of the present invention to provide a good performance triplet optical objective in which at least two of the elements are sufficiently close at the center to permit contact at the edges thus avoiding the usual spacer between such elements.

These objects are obtained by the optical objectives hereinafter described in detail because one or more of the lens elements is made of glass with characteristics of window glass or common crown glass and at least one of such lens elements has a flat surface. Hence economy is effected as commercial flat drawn plate glass can be used with the flat surface as supplied or reworked by a simple flat grind and/or polish. Some of the modifications herein described also have two of the lens elements sufficiently close together to permit their being mounted in a lens holder without usual spacer.

As used herein window glass, or common crown glass is defined as any glass with an index of refraction $N_D$ in the sodium D line of the solar spectrum equal to between 1.50 and 1.53, and a reciprocal dispersion ratio V equal to between 56 and 65; the reciprocal dispersion ratio V being defined as $(N_D-1) \div (N_F-N_C)$ where $N_F$ is the index of refraction of the glass in the Fraunhoefer "F" line of the solar spectrum, and $N_C$ is the index of refraction of the glass in the Fraunhoefer "C" line of the solar spectrum. The term optical glass as used herein is defined as any glass with its $N_D$ and V not within the above limits.

Other objects and advantages will be apparent in the details of construction, and in the form and arrangement of the parts of the objective by reference to the specification here below and the accompanying drawings in which.

A photographic or projection objective constructed according to my invention comprises three optically aligned elements, the element nearest the long conjugate side of the objective being a collective lens element designated L in the first and second embodiments, and W in the third and fourth embodiments, the second lens element being a negative double concave lens element designated M in the first and second embodiments, and X in the third and fourth embodiments, and the third lens element of said objective being collective and designated N and in the first and second embodiments and Y in the third and fourth embodiments. The space between the first lens element and the second lens element in all embodiments is designated $S_1$ and the space between the second and the third lens element in all embodiments is designated $S_2$. The center thicknesses of the three lens elements in all embodiments are designated $D_1$, $D_2$ and $D_3$ respectively. In all embodiments $R_1$ to $R_6$ inclusive represent the radii of the refractive lens surfaces, numbered from the front (left) to the rear (right) respectively.

In all embodiments the first and third lens elements are made of inexpensive common crown glass. In the first and second embodiments the first and third lens and the third and fourth embodiments the first lens all have a plane surface. This plane or flat surface may be used either as furnished in the commercial state or slightly reworked where greater accuracy is required. The triplets made in accordance with the following constructional data and conditions have a relatively wide field angle and a comparatively high relative aperture and good image quality, as shown in graphs of FIGS. 2, 3, 4, 6, 7, 8, and 9 while using lens elements made of inexpensive ordinary crown glass as described some of which are plano-convex.

The combined positive power of the two outer collective lenses L and N in the first and second embodiments should have a value between +3.8P and +4.1P, where P is the final power of the complete objective. The dispersive and negative central element M of these embodiments should have a power between —3P and —4P. The powers of the second surface of the first element, and the first surface of the last element of both embodiments should be substantially zero for reasons of low cost of fabrication, and when taken with the novel arrangements of powers, positions and indices herein described, an objective lens is achieved which has, in addition to the low cost of fabrication, desirable image-forming properties.

Figure 1:
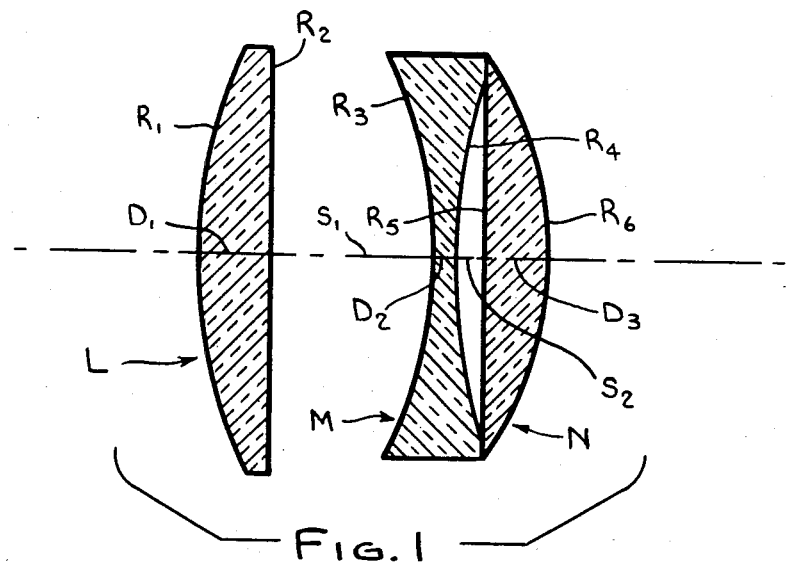
FIG. 1 is a diagrammatic view of triplet incorporating my invention to which the constructional data of the first and second embodiments herein set forth is applied.
Figures 2, 3, 4:
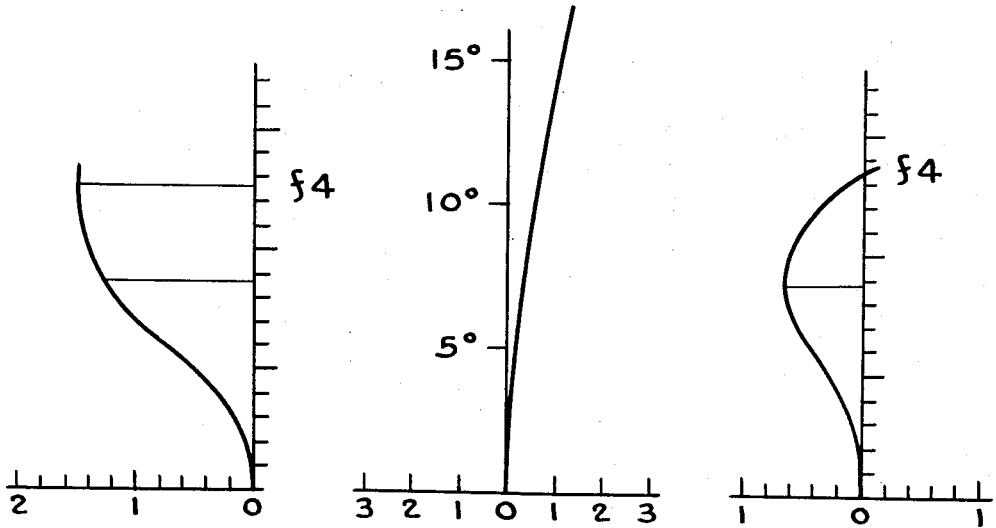
FIG. 2 is a graph representing the spherical aberration of the first embodiment.
FIG. 3 is a graph representing the residual tangential and sagittal astigmatism of the first embodiment.
FIG. 4 is a graph representing the spherical aberration of the second embodiment.

Constructional data to be applied to the diagrammatic view of FIG. 1 for manufacturing the first embodiment or one typical objective lens according to the above specified conditions is given on the following table. In all tables EF is the equivalent focal length for the D line of the solar spectrum.

| Lens | $EF_D=100$ | f/4 | Field angle=15° | |
|---|---|---|---|---|
| | Radii | D and S | $N_D$ | V |
| L | $R_1=+30.30$ | $D_1=4.42$ | 1.523 | 58.5 |
| L | $R_2=\infty$ | $S_1=10.86$ | 1.523 | 58.5 |
| M | $R_3=-27.88$ | $D_2=1.35$ | 1.605 | 38 |
| M | $R_4=+49.13$ | $S_2=1.06$ | 1.605 | 38 |
| N | $R_5=\infty$ | $D_3=4.42$ | 1.523 | 58.5 |
| N | $R_6=-22.3$ | | 1.523 | 58.5 |

Constructional data to be applied to the diagrammatic view of FIG. 1 for manufacturing the second embodiment or another typical objective lens according to the above conditions is given in the following table:

| Lens | $EF_D=100$ | f/4 | Field angle=15° | |
|---|---|---|---|---|
| | Radii | D and S | $N_D$ | V |
| W | $R_1=+30.30$ | $D_1=4.42$ | 1.523 | 58.5 |
| W | $R_2=\infty$ | $S_1=10.86$ | 1.523 | 58.5 |
| X | $R_3=-27.09$ | $D_2=1.35$ | 1.588 | 53.3 |
| X | $R_4=+47.73$ | $S_2=1.06$ | 1.588 | 53.3 |
| Y | $R_5=\infty$ | $D_3=4.42$ | 1.523 | 58.5 |
| Y | $R_6=-22.3$ | | 1.523 | 58.5 |

Figure 5:
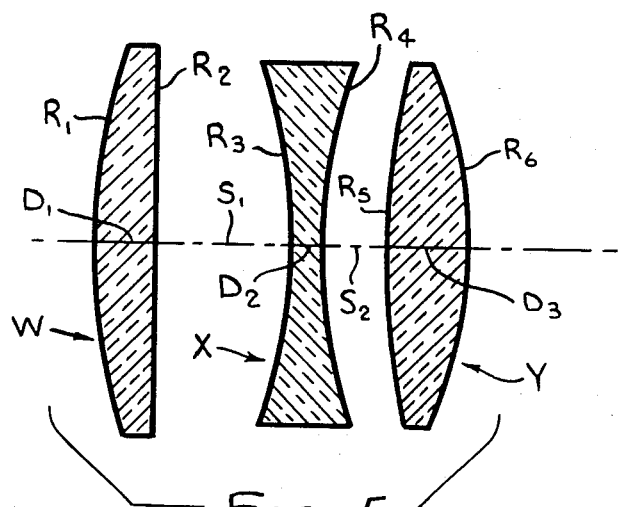
FIG. 5 is a diagrammatic view of a triplet incorporating my invention to which the constructional data of the third and fourth embodiments herein set forth is applied.
Figure 6:
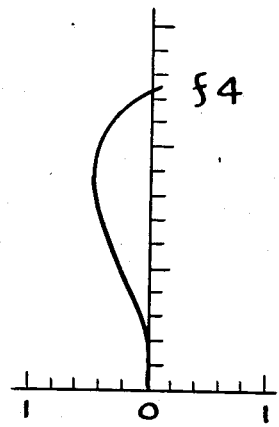
FIG. 6 is a graph representing the spherical aberration of the third embodiment.
Figure 7:
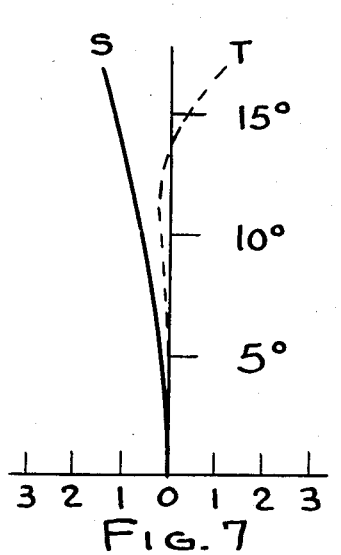
FIG. 7 is a graph representing the residual tangential and sagittal astigmatism of the third embodiment.
Figure 8:
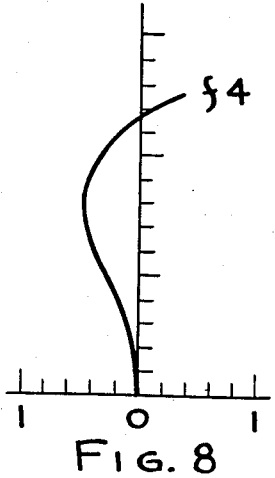
FIG. 8 is a graph representing the spherical aberration of the fourth embodiment.
Figure 9:
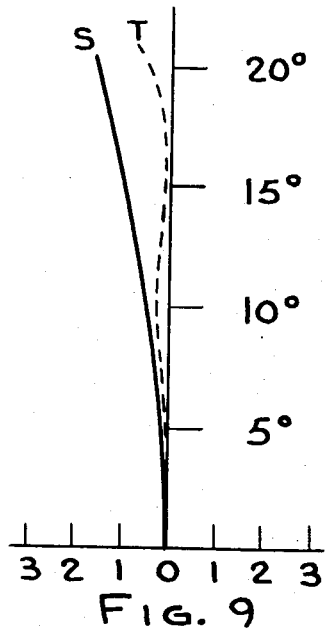
FIG. 9 is a graph representing the residual tangential and sagittal astigmatism of the fourth embodiment.

Constructional data to be applied to the diagrammatic view of FIG. 5 for manufacturing the third embodiment or another typical color corrected objective is given in the following table:

| Lens | $EF_D=100$ | f/4 | Field angle=15° | |
|---|---|---|---|---|
| | Radii | D and S | $N_D$ | V |
| W | $R_1=+34.85$ | $D_1=3.79$ | 1.520 | 60.1 |
| W | $R_2=\infty$ | $S_1=9.08$ | 1.520 | 60.1 |
| X | $R_3=-36.68$ | $D_2=1.78$ | 1.5956 | 39.5 |
| X | $R_4=+36.68$ | $S_2=4.64$ | 1.5956 | 39.5 |
| Y | $R_5=+82.38$ | $D_3=5.29$ | 1.520 | 60.1 |
| Y | $R_6=-28.70$ | | 1.520 | 60.1 |

Constructional data to be applied to the diagrammatic view of FIG. 5 for manufacturing the fourth embodiment or still another typical color corrected objective is given below:

| Lens | $EF_D=100$ | f/4 | Field angle=20° | |
|---|---|---|---|---|
| | Radii | D and S | $N_D$ | V |
| W | $R_1=+34.14$ | $D_1=3.7$ | 1.5145 | 59 |
| W | $R_2=\infty$ | $S_1=10.26$ | 1.5145 | 59 |
| X | $R_3=-36.59$ | $D_2=1.7$ | 1.605 | 38 |
| X | $R_4=+36.59$ | $S_2=4.22$ | 1.605 | 38 |
| Y | $R_5=+77.27$ | $D_3=5.15$ | 1.5145 | 59 |
| Y | $R_6=-28.56$ | | 1.5145 | 59 |

In the three element objective in the third and fourth embodiments, the radii of curvature may be varied slightly from the values shown, and with proper simple compensations known to one skilled in this art, the same basic results may be obtained while still using the invention herein disclosed. These variations are characterized by $R_1$ varying between 32 and 36, $R_3$ and $R_4$ between 35 and 38, $R_5$ between 74 and 80, and $R_6$ between 27 and 30 units, where the focal length of the objective is substantially 100. Also, in this same way, $D_1$, $D_2$, and $D_3$ may vary by plus or minus one unit, and $S_1$ and $S_2$ may vary as much as plus or minus 2 units.

It will be apparent to those skilled in this art that other typical forms of photographic and projection objectives may be constructed within the specifications and conditions set forth in the above description, and changes and substitutions may be made therein without departing from the spirit of the invention as defined in the claims here below appended.

I claim:

1. A photographic or projection objective, or the like, having a relative aperture between f/3.5 and f/4.5 and corrected for spherical aberration, chromatic aberration, coma, astigmatism, and curvature of field, comprising three air-spaced lens elements in optical alignment with each other, the first lens element being convex-plano with the radius of curvature of the first surface being between .32f and .36f, where f is the focal length of the complete objective, the second surface being substantially flat, the second lens element being bi-concave with radii of curvature substantially numerically equal and between .35f and .38f, and the third element having a first convex surface with a radius of curvature between .74f and .80f, and a second convex surface with a radius of curvature between .27f and .30f, the center thickness of the said first lens element being between .027f and .047f, the center thickness of the said second lens element being between .007f and .027f, and the center thickness of the said third lens element being between .041f and .061f, the separation of the said first lens element and the said second lens element being between .083f and .123f, and the separation of the said second lens element and the said third lens element being between .022f and .062f, the glass used for said first and third lens elements having an index of refraction $N_D$ of 1.53 or lower and a reciprocal dispersion ratio V between 56 and 65, the glass used for said second lens element having an index of refraction $N_D$ of 1.58 or higher and a reciprocal dispersion ratio V between 35 and 56.

2. A photographic or projection objective, corrected for spherical aberration, chromatic aberration, coma, astigmatism and curvature of field, and having its optical constants substantially according to the following table:

| Lens | $EF_D=100$ | f/4 | Field angle=15° | |
|---|---|---|---|---|
| | Radii | D and S | $N_D$ | V |
| W | $R_1=+34.85$ | $D_1=3.79$ | 1.520 | 60.1 |
| W | $R_2=\infty$ | $S_1=9.08$ | 1.520 | 60.0 |
| X | $R_3=-36.68$ | $D_2=1.78$ | 1.5956 | 39.5 |
| X | $R_4=+36.68$ | $S_2=4.64$ | 1.5956 | 39.5 |
| Y | $R_5=+82.38$ | $D_3=5.29$ | 1.520 | 60.1 |
| Y | $R_6=-28.70$ | | 1.520 | 60.1 | wherein: W is a collective first lens element nearest the long conjugate side of the objective; X is a negative double concave second lens element of the objective; Y is a collective third lens element of the objective; $S_1$ is the space between W and X; $S_2$ is the space between X and Y; $D_1$ is the center thickness of W; $D_2$ is the center thickness of X; $D_3$ is the center thickness of Y; $R_1$ is the radius of the outer refractive lens surface of W; $R_2$ is the radius of the refractive lens surface of W facing X; $R_3$ is the radius of the refractive lens surface of X facing W; $R_4$ is the radius of the refractive lens surface of X facing Y; $R_5$ is the radius of the refractive lens surface of Y facing X; $R_6$ is the radius of the outer refractive lens surface of Y; $N_D$ is the index of refraction in the sodium D line of the solar spectrum; V is the reciprocal dispersion ratio defined as $(N_D-1) \div (N_F-N_C)$ where $N_F$ is the index of refraction of the glass in the Fraunhoefer "F" line of the solar spectrum, and $N_C$ is the index of refraction of the glass in the Fraunhoefer "C" line of the solar spectrum; $EF_D$ is the equivalent focal length for the D line of the solar spectrum; $\infty$ is infinity; and f/4 is the relative free aperture.

3. A photographic or projection objective, or the like, corrected for spherical aberration, chromatic aberration, coma, astigmatism, and curvature of field, and having its optical constants according to the following table:

| Lens | EF$_D$=100 | | f/4 | Field angle=20° |
|---|---|---|---|---|
| | Radii | D and S | N$_D$ | V |
| W | R$_1$=+34.14 | D$_1$=3.7 | 1.5145 | 59 |
| W | R$_2$=∞ | S$_1$=10.26 | 1.5145 | 59 |
| X | R$_3$=−36.59 | D$_2$=1.7 | 1.605 | 38 |
| X | R$_4$=+36.59 | S$_2$=4.22 | 1.605 | 38 |
| Y | R$_5$=+77.27 | D$_3$=5.15 | 1.5145 | 59 |
| Y | R$_6$=−28.56 | | 1.5145 | 59 | wherein: W is a collective first lens element nearest the long conjugate side of the objective; X is a negative double concave second lens element of the objective; Y is a collective third lens element of the objective; S$_1$ is the space between W and X; S$_2$ is the space between X and Y; D$_1$ is the center thickness of W; D$_2$ is the center thickness of X; D$_3$ is the center thickness of Y; R$_1$ is the radius of the outer refractive lens surface of W; R$_2$ is the radius of the refractive lens surface of W facing X; R$_3$ is the radius of the refractive lens surface of X facing W; R$_4$ is the radius of the refractive lens surface of X facing Y; R$_5$ is the radius of the refractive lens surface of Y facing X; R$_6$ is the radius of the outer refractive lens surface of Y; N$_D$ is the index of refraction in the sodium D line of the solar spectrum; V is the reciprocal dispersion ratio defined as $(N_D-1) \div (N_F-N_C)$ where N$_F$ is the index of refraction of the glass in the Fraunhoefer "F" line of the solar spectrum, and N$_C$ is the index of refraction of the glass in the Fraunhoefer "C" line of the solar spectrum; EF$_D$ is the equivalent focal length for the D line of the solar spectrum; ∞ is infinity; and f/4 is the relative free aperture.

References Cited in the file of this patent

UNITED STATES PATENTS

| | | |
|---|---|---|
| 180,776 | Mead | Aug. 8, 1876 |
| 1,035,408 | Beck et al. | Aug. 13, 1912 |
| 1,485,929 | Holst | Mar. 4, 1924 |
| 1,892,162 | Richter | Dec. 27, 1932 |
| 2,487,873 | Herzberger et al. | Nov. 15, 1949 |
| 2,596,799 | Tillyer et al. | May 13, 1952 |

FOREIGN PATENTS

| | | |
|---|---|---|
| 1,583 | Great Britain | of 1888 |
| 364,994 | Great Britain | Jan. 14, 1932 |
| 548,427 | France | Oct. 21, 1922 |
| 824,641 | France | Nov. 18, 1937 |